Sept. 13, 1960  G. SCHNITTKER  2,952,342
DUST FILTER HAVING SPACED FILTER ELEMENTS
AND FRAME FOR HOLDING SAME
Filed Feb. 12, 1958  2 Sheets-Sheet 1
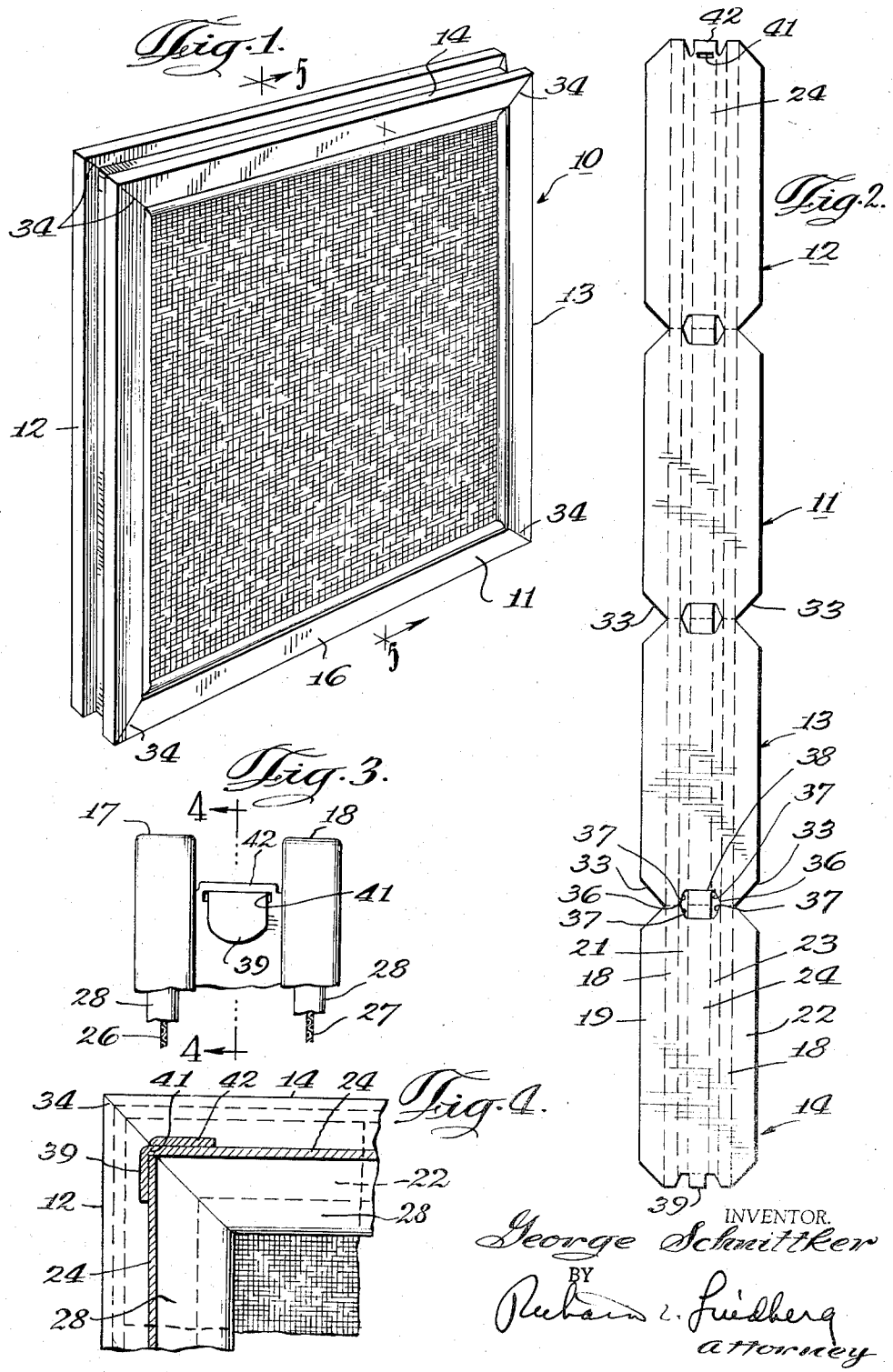
INVENTOR.
George Schnittker
BY
Richard L. Lindberg
attorney

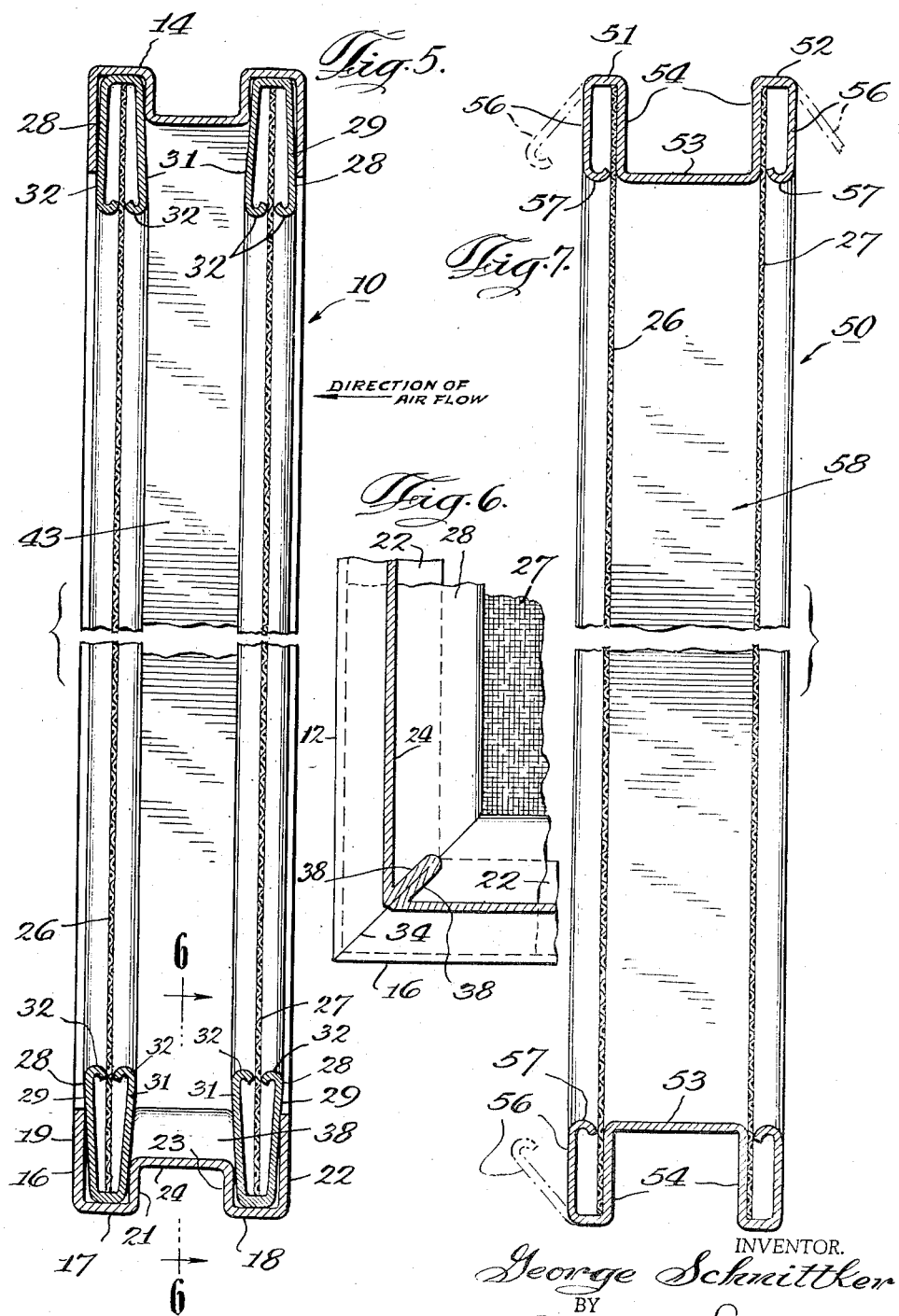

United States Patent Office 2,952,342
Patented Sept. 13, 1960

2,952,342

DUST FILTER HAVING SPACED FILTER ELEMENTS AND FRAME FOR HOLDING SAME

George Schnittker, 900 E. Roosevelt Road, Lombard, Ill.

Filed Feb. 12, 1958, Ser. No. 714,883

1 Claim. (Cl. 189—36)

This invention relates generally to dust filters having spaced filter elements and to a frame holding the filter elements in position.

Apparatus according to the present invention is especially useful as a filter for warm air furnaces or for air conditioning, and is characterized by the ability to trap particles of both large and small sizes without offering large resistance to flow of the air stream.

According to the present invention, the filter comprises a filter element having passages of a larger dimension than a second element having passages of a smaller dimension, the two being maintained a distance apart in a frame, the filter element having the larger dimension passages being exposed to dust laden air, and the other being exposed only to the air having some of the dust removed therefrom. The filter elements are maintained in a frame and are held a desired distance apart, and the intervening space can trap any dust dislodged from the two proximate faces of the spaced filter elements.

In a preferred embodiment of the invention the frame holding the filter elements is stiffened by providing miter elements extending inward at the frame corners and integral with the framing material. These miter elements extend inward from a web connecting a pair of spaced channels and are integral with the material forming the web. The two spaced channels afford a means of securing the filter elements in place, each such filter element being secured in a suitable frame, the sides of which bear against the side flanges of the spaced channels. The frame holding the filter elements is locked together by cooperating tangs, one of which passes through the web member and bent thereover, the other being bent over the web member from which the tang extends.

In another embodiment of the invention the frame holding filter elements consists of a pair of spaced channels with the proximate flanges of the two channels connected by a web. In forming the frame, the remote flanges of the channels are each provided with an inturned bead and the filter elements are placed in position against the proximate flanges of the channel members, the remote flanges and the inturned beads being pressed against the filter elements to secure them in place against the inner flanges.

With the foregoing considerations in mind it is a principal object of the invention to provide an improved dust filter characterized by a pair of spaced filter elements, one having larger passages therein and being exposed to dust laden air, the other filter element being spaced from the first filter element and having smaller passage therein, and being exposed only to the air which has been partly separated from its dust content.

Another object is to provide an improved dust filter and support frame therefor, the frame being characterized by being made from a strip of sheet material and having mitered inward extending portions lending to the stiffness of the frame when assembled.

Yet another object is to provide a frame for supporting spaced filter elements, said frame being characterized by a frame with a pair of spaced channels for supporting spaced filter elements, the two filter elements being placed in position by forcing the remote flanges and inturned beads thereon against the inner and proximate flanges of the two channels.

Still another object is to provide a filter frame having an improved locking connection therefor.

Other objects and important features of the invention will be apparent from a study of the specification following taken with the drawings which together describe and illustrate some preferred embodiment of the invention and what are now considered to be the best modes of practicing the principles thereof. Other embodiments may be suggested to those having the benefit of the teachings herein, and such other embodiments are intended to be reserved especially as they fall within the scope and spirit of the subjoined claims.

In the drawings:

Fig. 1 is a perspective view of an improved dust filter according to one embodiment of the invention;

Fig. 2 is a plan view of a punched blank which is rolled and formed to make the frame of the dust filter seen in Fig. 1;

Fig. 3 is an end elevational view to an enlarged scale of a portion of the filter seen in Fig. 1;

Fig. 4 is a sectional view taken along the lines 4—4 of Fig. 3 looking in the direction of the arrows;

Fig. 5 is a vertical sectional view taken along the line 5—5 of Fig. 1 looking in the direction of the arrows;

Fig. 6 is a sectional view taken along the lines 6—6 of Fig. 5 looking in the direction of the arrows; and Fig. 7 is a sectional view similar to Fig. 5, showing details of construction according to another embodiment of the invention.

Referring now to Figs. 1 to 6 of the drawings, an improved dust filter according to one embodiment of the invention is referred to generally by the reference numeral 10 and includes a frame 11 having spaced side frame elements 12 and 13, a top frame element 14 and a bottom frame element 16.

As seen in Figs. 3 and 5 each of the frame elements 12, 13, 14 and 16 comprises a structural section consisting of a pair of spaced channels 17 and 18, spaced channel 17 having a remote flange 19 and an inner flange 21. Channel 18 likewise has a remote flange 22 and an inner flange 23, the inner flanges 21 and 23 being connected by a web 24.

The channels 17 and 18 are arranged to support filter elements 26 and 27 respectively. Each of the filter elements 26 and 27 is held in a frame 28 having frame rails 29 and 31, each such rail having an inturned bead 32 which is closed against the filter element 26 or 27 to hold same in place there-between.

As seen in Fig. 2, the frame thus far described is from a punched blank of strip material, and is punched with notches 33 forming miters 34, see Fig. 1 at the corners of the frame seen in Fig. 1. The blank is also punched with dove shaped portions 36, so that when the strip seen in Fig. 2 is formed in shaping rolls and bent to the configuration seen in Fig. 1, edges 37 move into contact, with a portion 38 therebetween folded as seen in Figs. 5 and 6 to provide mitered portions 38 extending diagonally inward as seen in Figs. 5 and 6.

The aforesaid miter portions give stiffness to the frame seen in Fig. 1, to prevent warping from the plane thereof.

The side frame element 12 and the upper portion 14 are locked together by means of a tang 39 extending from the web 24 of the top frame element 14 which enters a locking slot 41 in the web portion 24 of the side frame element 12, see Fig. 4, the tang 39 being folded over against the web 24 of the side frame element 12. The web 24 of the side frame element 12 likewise has a tang 42 which can be folded over against the web 24 of top frame element 14.

The two filter elements 26 and 27 have passageways therethrough of different dimensions for a purpose as now will be described. As seen in Fig. 5, filter element 27 is positioned against the direction of flow of dust laden air and has passageways therein of relatively larger dimension to separate from the dust laden air particles of larger size. Filter element 26 has its passageways of smaller dimension to separate from the air which has been separated from its larger dust particles, the dust particles of smaller dimension.

The chamber 43 between the two filter elements 26 and 27 afford a means of trapping any dust dislodged from the proximate faces of the two filter elements 26 and 27. Any vibration in the system wherein the filter unit 10 is employed will tend to cause the dust to be dislodged from the filter element 26 to maintain the filter element in good working efficiency. The filter elements 26 and 27 are made from certain types of foraminous plastic sheet material such as polyethylene or the like.

Referring now to Fig. 7 of the drawings, there is shown another embodiment of the invention indicated generally by the reference numeral 50. In this case the two filter elements 26 and 27 are not held in their individual frames, but are held in spaced channels 51 and 52 maintained in spaced relationship by a connecting web 53. Each of the channels 51 and 52 has flange portions 54 continuous with the spacing web 53, and remote flanges 56, each such flange having an inturned bead 57.

The frame supporting the filter elements 26 and 27 seen in the embodiment of Fig. 7 is formed from a strip similar to that seen in Fig. 2. However, in initially forming and rolling the strip making up the frame of the embodiment seen in Fig. 7, the flanges 56 are first rolled to the dotted line in position seen. The filter elements 26 and 27 are placed in position against the flanges 54, and the exterior flanges 56 are forced against the filter elements 26 and 27 so that each filter element is engaged between the flange 54 and the bead 57. Such operation is formed by moving the frame between a pair of rollers which presses the exterior flanges against the interior flange 54 in the manner as described.

In this embodiment of the invention the filter element 27 is the one first exposed to the dust laden air, it having the passageways of larger dimension. The filter element 26 has the passageways of smaller dimension, to complete the separation of the dust from the air. The chamber 58 formed between the filter elements 26 and 27 affords a means of trapping dust dislodged from the filter elements 26 and 27.

In either embodiment of the invention the dust can be effectively separated from the air without greatly impeding the movement thereof.

While the invention has been described in terms of a number of preferred embodiments thereof, its scope is intended to be limited only by the claim herein appended.

I claim as my invention:

A frame particularly adapted to hold dust filters or the like, said frame comprising connected sections each of which has a pair of spaced channels, each of said spaced channels comprising inner and outer flanges with the proximate inside flanges of said channels connected by a web, said connected sections being formed from a flat strip which is bent along lines extending longitudinally thereof to define the aforesaid spaced channels and connecting web, cut out portions provided in said flat strip and spaced at intervals therealong, there being four cut out portions arranged transversely of said strip at each interval, a pair of said cut out portions being located in those portions of said flat strip defining said outer flanges of each section, and a further pair of said cut out portions being in those portions of said flat strip defining the proximate inside flanges of each section, all of said cut out portions enabling said flat strip when formed in the connected sections described to be bent transversely of itself at said cutout portions so that adjacent connected sections have an included angle of 90°, said cutout portions providing a mitre between the adjacent sections and enabling the portion of the web between said proximate inside flanges to be bent inwardly of said frame upon itself to provide a pair of web portions in contact with each other capable of providing resistance of said connected sections to distortion out of the plane of the so connected sections.

References Cited in the file of this patent

UNITED STATES PATENTS

| | | |
|---|---|---|
| 378,188 | Bruhn et al. | Feb. 21, 1888 |
| 764,922 | Davis | July 12, 1904 |
| 1,598,097 | Mathis | Aug. 31, 1926 |
| 2,393,419 | Schaaf | Jan. 22, 1946 |
| 2,421,743 | Cartter et al. | June 10, 1947 |
| 2,639,003 | Russell | May 10, 1953 |
| 2,675,887 | Gonzales | Apr. 20, 1954 |
| 2,677,436 | Mazek | May 4, 1954 |
| 2,754,928 | Hambrecht et al. | July 17, 1956 |
| 2,818,937 | Brixius | Jan. 7, 1958 |